United States Patent [19]
Cordier

[11] Patent Number: 4,697,273
[45] Date of Patent: Sep. 29, 1987

[54] ELECTRODE STRUCTURE FOR A BATH OF MOLTEN METAL

[75] Inventor: Jean Cordier, Saint-Saulve, France

[73] Assignee: Union Siderurgique du Nord et de l'Est de la France (USINOR), Puteaux, France

[21] Appl. No.: 781,550

[22] Filed: Sep. 30, 1985

[30] Foreign Application Priority Data

Oct. 1, 1984 [FR] France .................................. 84 15065

[51] Int. Cl.[4] .............................................. H05B 7/00
[52] U.S. Cl. ...................................... 373/72; 373/108
[58] Field of Search .................................. 373/36-38, 373/72, 108, 88, 71, 48, 55, 120

[56] References Cited

U.S. PATENT DOCUMENTS

| | | | |
|---|---|---|---|
| 1,561,731 | 11/1925 | Kostka | 373/100 |
| 1,645,091 | 10/1927 | Chapman | 373/130 |
| 3,391,236 | 7/1968 | Blumenfeld | 373/38 |
| 4,566,108 | 1/1986 | Buhler | 373/72 |

FOREIGN PATENT DOCUMENTS 1229497 9/1960 France .
452730 3/1968 Switzerland .

Primary Examiner—Roy N. Envall, Jr.
Attorney, Agent, or Firm—Cushman, Darby & Cushman

[57] ABSTRACT

The electrode structure, embedded in a refractory lining (1) covering the wall (2) of a vessel containing the bath (5) of metal, flush at one (4) of its ends with the inner surface of the refractory lining and projecting at its other end (6) out of the vessel, is of the type comprising an electrically conductive central core (3) extending through the wall (3) of the vessel and a cooling jacket (11) disposed around the central core (3) and in close contact therewith. The feature of the electrode structure is that the central core (3) is connected by its end (6) outside the vessel to an electric supply terminal (7), the zone of the central core (3) adjacent to the outer end (6) and in facing relation to the cooling jacket (11) being electrically insulated from the cooling jacket.

15 Claims, 3 Drawing Figures

ELECTRODE STRUCTURE FOR A BATH OF MOLTEN METAL

The present invention relates to a high-current electric connecting device whose function is to ensure the passage of the electric current from a conductive molten mass contained in a vessel to a cable for connection to the mains supply or for the return to earth or neutral. It more particularly concerns a sole electrode for an arc ladle or furnace containing a bath of molten steel.

Devices of this type, and in particular sole electrodes for an arc furnace, are placed within the thickness of the refractory lining covering the casing and ensure the passage of the electric current between the bath of molten metal contained in the furnace and a terminal of the electric supply cable outside the casing. Bearing in mind the temperatures reached in the furnace and the heat generated by eddy currents within the electrode itself, it is necessary to provide an energetic cooling of the electrode so as to avoid the melting of the latter and the extremely harmful consequences which would result, such as the piercing and destruction of the electrode.

Solutions have already been proposed for cooling the electrode and comprise usually placing around the central core constituting the electrically conductive element, a jacket cooled by a circulation of cooling fluid, this jacket being in intimate contact with the central core and electrically connected to the electric supply terminal outside the furnace so as to ensure also the conduction of electricity.

Now, in the course of normal operation of the furnace with its charging, melting, refining and pouring cycles, the electrode is subjected to many thermal cycles which produce alternating expansions of the core and consequently an unstable contact with the jacket owing to differential expansions.

Further, owing to the fact that the contact between the jacket and the core of the electrode ensures the passage of the electric current, a rise in temperature occurs in this zone which is contrary to the cooling function of the jacket.

An object of the present invention is to overcome these drawbacks by providing an electrode structure which is suitable cooled and ensures a reliable electric connection and a very low resistance while it tolerates the alternating expansions.

The invention therefore provides an electrode structure for a bath of molten metal, embedded in a refractory lining covering the wall of the vessel containing the bath of metal, flush at one of its ends with the inner surface of the refractory lining and projecting at its other end out of the vessel, of the type comprising an electrically conductive central core extending through the wall of the vessel and a cooling jacket disposed around the central core and in contact therewith, wherein the central core is directly connected by its end outside the vessel to an electric supply terminal, the zone of the central core adjacent to the outer end and facing the cooling jacket being electrically insulated from said jacket.

According to other features of the invention:

the cooling jacket is connected to the wall of the vessel by a fixing flange and projects into the refractory lining so as to cool the zone of passage of the electrode through the wall of the vessel;

the end of the central core outside the vessel is connected to a suspension flange connected by telescopic arms having springs to the jacket-fixing flange;

the electric connection between the end of the central core outside the vessel and the supply cable is ensured by an internally cooled nipple which is in one piece with the terminal, screwed into the central core and connects the suspension flange to the central core;

the central core is inserted in an electrically insulating sleeve interposed between the core and the cooling jacket in a part adjacent to the outer end of the core.

One of the essential advantages of the invention resides in the absence of interaction between the functions of electric conduction and cooling of the electrode.

Indeed, the dissipation of heat by eddy currents in the region of the end of the conductive central core is limited owing to an excellent reproducible and reliable contact achieved with the nipple. Further, owing to the fact that this nipple is connected to the central core, it follows the latter in the course of the alternating expansions and there is consequently no risk of a localized heating and production of an arc.

The nipple itself is cooled by an internal circulation of cooling fluid at the bottom of a thread between the nipple and the core of the electrode. It effectively contributes to the dissipation of the heat generated by eddy currents. This device eliminates the superposition on the heat discharged through the walls of the cooling jacket located at a higher level, of the heat generated by eddy currents.

The central core of the electrode expands and contracts freely owing to the elastic suspension independent of the fixed cooling jacket, in which the core is slidable if the expanding forces are excessive. The combination of two opposed springs in the suspension returns the central core to its normal position under full power conditions.

The inner wall of the cooling jacket of the type having a double wall may moreover expand freely owing to its structure which will be described in detail hereinafter.

These advantages result in an increased resistance to the alternating thermal cycle, i.e. in a long life compactible with the life of the sole of the furnace.

The thermal losses are moreover reduced, as are the risks of piercing owing to the adapted cooling.

The invention will be described hereinafter in more detail with reference to the accompanying drawing which shows only one embodiment thereof. In the drawing.

Figure 1:
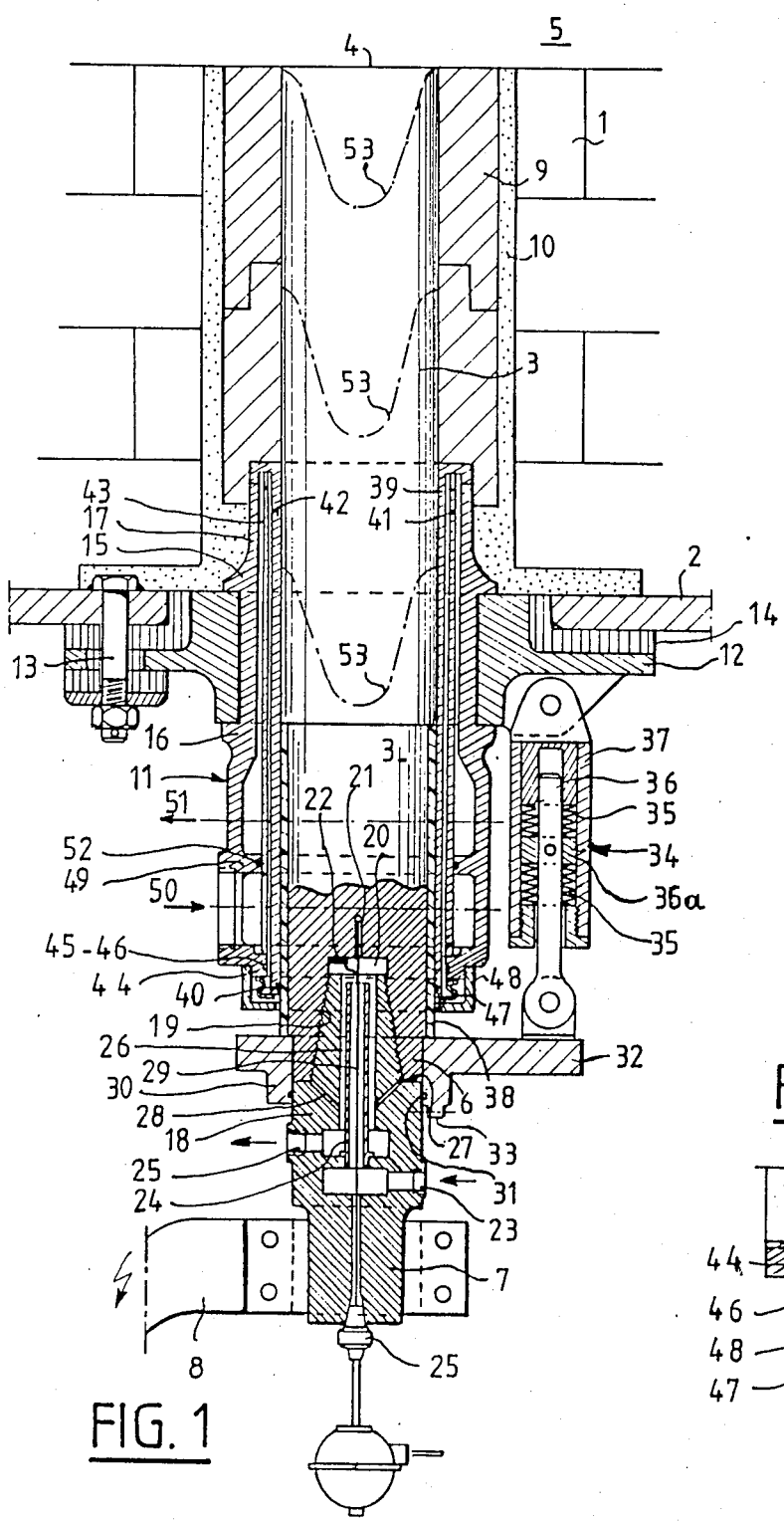
FIG. 1 is an axial sectional view of the sole electrode according to the invention.
Figure 2:
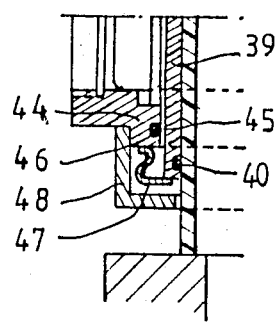
FIG. 2 is a view to an enlarged scale of a detail of this electrode.

The electrode structure shown in the drawing is embedded in a refractory lining 1 covering the wall or the casing 2 of the sole of a dc electric furnace.

This electrode has a central core 3 of cylindrical shape flush at its end 4 with the inner surface of the refractory lining 1 in contact with the bath 5 of molten steel.

The central core is made from an electrically conductive material, for example from a steel billet, and extends through the wall 2 of the furnace and projects at its other end 6 out of the furnace for the purpose of ensuring the electric conduction of the current between the bath 5 of metal and a supply terminal 7 connected to the electric mains by a cable 8 which may be internally cooled.

In its part inside the refractory lining 1, the central core 3 is disposed in a high-performance refractory sleeve 9 which is rendered rigid with the lining 1 by refractory clay or concrete 10.

The central core extends through the casing 2 of the furnace in a cooling jacket which can serve as a mould 11 which performs the function of an electrode holder.

This cooling jacket is connected to the wall 2 by a fixing flange 12 in three circular sectors so as to facilitate the mounting and dismantling, this flange being fixed to the wall 2 by bolts 13. The fixing flange 12 is electrically insulated from the wall 2 by a dielectric sealing element 14 so as to avoid possible leakage currents communicating with the earth.

The fixing flange 12 bears against the cooling jacket 11 between two shoulders 15 and 16 formed on the outer surface of the case 17 of the latter.

At its end 6 outside the furnace, the central core receives a nipple 18 which is one piece with the terminal 7 and is screwed in a tapered screwthreaded bore 19 having the same vertical axis as the central core 3. The end of this bore has a cavity 20 in which a thermocouple 21 and an ultra-sound liquid level detector 22 are disposed.

The nipple 18 is made from copper and internally cooled by a circulation of cooling fluid which is in practice water or oil which enters by way of an orifice 23 and a conduit 24 and reaches the cavity 20 and circulates in a return circuit through two distinct passageways and is discharged through an orifice 25. The main one of these passageways passes through an annular channel 26 formed around the conduit 24 and the other passageway, which is complementary, is formed by the circulation of the cooling fluid at the bottom of the thread 19 from the cavity 20 to the root 27 of the thread 19 whence it flows through channels 28 communicating with the channel 26.

The conduit 24 is also employed for the passage of the connecting conductors designated by the single reference 29, of the thermocouple 21 and the ultrasound detector 22.

The body of the nipple 18 is received in a spigot 30 provided along its inner surface with a groove in which is disposed an O-ring 31 which provides a seal for the cooling fluid circulating at the bottom of the thread 19.

This spigot is in one piece with a suspension flange 32 and includes on its lower side a group of studs 33 (for example 4 to 8 studs equally spaced apart circumferentially) defining orifices for the passage of screws (not shown) which are screwed in corresponding tapped holes formed in the body of the nipple 18 so as to connect the latter, and consequently the end 6 of the core 3, to the suspension flange 32.

The suspension flange 32 is connected by telescopic arms 34 to the fixing flange 12. There are three arms 34 spaced 120° apart and pivotally mounted on the suspension flange 32 which is also in three circular sectors. These telescopic arms 34 provide a suspension of the central core which permits a compensation for the play due to the alternating expansions of the central core 3 as a function of the thermal cycle of operation of the furnace. These arms 34 are formed by a resilient stack of "Belleville" washers 35 connected to a rod 36 by a disk 36a and constituting return springs, the washers being disposed in a cylindrical body 37.

In its part adjacent to the end 6, the central core 3 is inserted in an electrically insulating sleeve 38 interposed between the core 3 and the cooling jacket 11. The sleeve 38 is extended in the cooling jacket 11 to an extent approximately between one third and one half of the jacket. The sleeve 38 is for example made from "Teflon" or "Viton".

The cooling jacket 11 or ingot mould which cools the central core extends along practically the whole of the part of the central core outside the furnace and projects at its upper end into the refractory lining 1 so as to cool the zone of passage of the electrode through the casing 2.

This jacket 11 has a double wall in order to ensure the circulation of a cooling fluid in two annular spaces defined hereinafter. The jacket 11 comprises a first cylindrical inner wall 39 which is mounted by welding along its inverted U-shaped upper edge to the outer case 17. The inner side of the wall 39 is in contact with the core 3 in its upper part and with the sleeve 38 in its lower part, the lower edge 40 of this wall being free.

A second median wall 41 is disposed inside the annular volume defined by the first wall 39 and the case 17 and defines two annular spaces 42 and 43 which communicate with each other respectively between the first wall 39 and the second wall 41, on one hand, and between the second wall 41 and the case 17, on the other hand.

The second wall 41 is in the form of a cylinder whose upper and lower edges have a crenelated shape so as to ensure the communciation between the annular spaces 42 and 43 required for the circulation of the cooling fluid.

The lower part of the case 17 of the cooling jacket forms a flange 44 whose inside diameter is slightly larger than the outside diameter of the first wall.

A seal is provided for the cooling liquid by an O-ring 45 disposed in a groove 46 formed in the inner surface of the flange 44 facing the first wall 39, and is completed by a compensating bellows 47 connected at one end to the flange 44 and at the other end to the lower edge 40 of the first wall 39.

The bellows is protected by a cap 48 which covers the flange and is provided with an orifice whose diameter is equal to the outside diameter of the sleeve 38.

The case 17 of the cooling jacket 11 further comprises an annular internal ring 49 which is in one piece therewith and whose inside diameter is slightly larger than the outside diameter of the second wall 41, this internal ring 49 defining the separation between the inlet 50 and the return 51 of the cooling fluid of the jacket having a double wall, the sealing being ensured by an O-ring 52 disposed in a groove formed in the inner surface of the internal ring 49 facing the second wall 41.

The cooling fluid, which is in practice water or oil, therefore enters the jacket 11 through the zone 50 located at a low level, then passes into the annular space 42 through the crenelations formed in the lower edge of the wall 41 placed on the inner surface of the spigot, circulates in the upward direction along the inner surface of the first wall 39, passes to the upper part of this wall 39 in the annular space 43 through the crenelations formed along the upper edge of the wall 39 and is discharged from the jacket through the zone 51. The sheet of water is made to circulate in the jacket 11 at a velocity of at least 3 m/sec.

The circulation of the cooling fluid produced in this way effectively cools the whole of the central core 3, and in particular along its upper part in contact with the jacket 11 which projects into the refractory lining 1 of the furnace. In this way, considerable heat fluxes are evacuated and this permits a stabilization of the solidification front between the liquid and solid parts of the core 3 of steel of the electrode in the middle of the height of the latter.

The curves 53 in dot-dash lines illustrate the evolution in the course of the alternating thermal cycles of the melting zone of the steel billet constituting the central core 3 of the electrode. Owing to the energetic cooling achieved with the jacket 11 which enters the furnace, the liquified zone cannot reach the sleeve 38. Its level is measured by the ultra-sound sensor 22 placed in the cavity 20 filled with cooling fluid.

A distinct separation is observed between the cooling functions defined hereinbefore and electric conduction starting at the nipple 18 in the insulating sleeve 38 where the heat produced by eddy currents is not superimposed.

The current lines in the electrode are rectilinear throughout the height of the electrode from the both 5 to the supply cable 8. The electric fields capable of producing by an electromagnetic effect a stirring of the liquid metal of the electrode are thus maintained at a very low level. The stirring of the liquid metal has the drawback, when it is considerable, of considerably increasing the flux of heat between the liquid metal and the part which remains solid of the core of the electrode, and therefore of moving back the solidification front toward the cooled end of the electrode. The electrode according to the invention therefore results in a more reliable and sure operation and lower thermal losses.

Further, the electrode structure described permits a measurement of the temperature at the end of the core by means of the thermo-couple 21 and also of the distance between the liquid pit bottom 53 of the core and the cooled nipple by the ultra-sound sensor 22.

Figure 3:
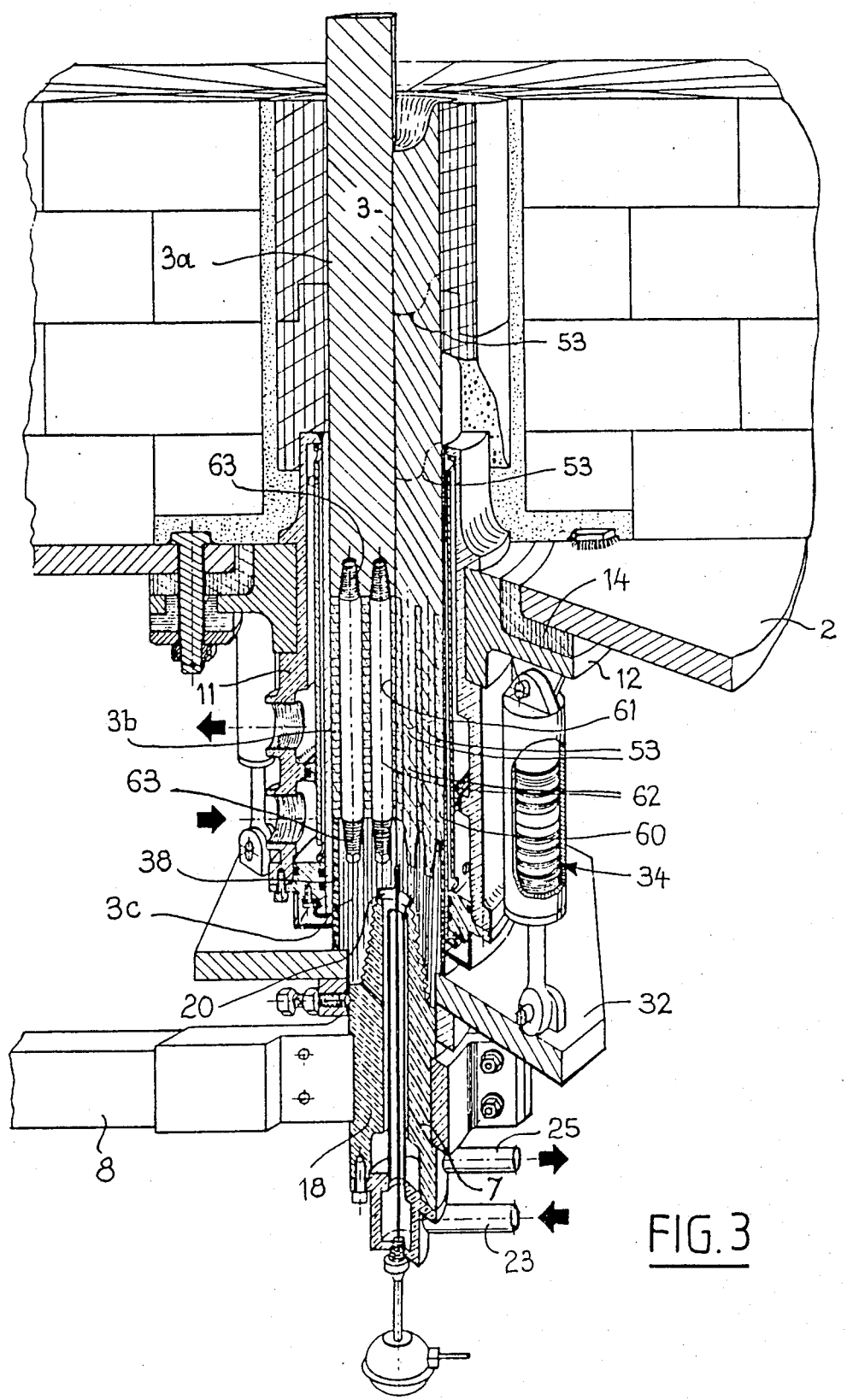
FIG. 3 is an exploded perspective view of a sole electrode according to the invention in a modification.

Shown in FIG. 3 is a modification of the sole electrode according to the invention, the corresponding elements shown in FIGS. 1 and 3 carrying the same reference characters. The left part of the central core 3, shown in section, corresponds to the structure of this core when the sole electrode is brought into action while the right part, also shown in section, corresponds to the structure of the core 3 after the electrode has been brought into action and after a certain electrode operating time. The central core 3 according to this modification comprises, from its end in contact with the bath 5 to its end 6 connected to the nipple 18, an upper part 3a of solid steel, an intermediate part 3b of composite structure and a solid metal lower part 3c. The intermediate part 3b is formed by an element 60 of refractory material trapped inside the cooling jacket 11 approximately at one half of the height of this jacket and provided with cylindrical axially-extending passageways 61 in which are introduced bars 62 of steel having a diameter a little less than the diameter of passageways 61. During operation of the electrode used in the furnace, the solid upper part 3a of the electrode is at least partly melted and, after a certain operating time, the bars 62 may be partly or completely melted, depending on the position of the limit 53 of the molten zone. Upon cooling, when operation of the installation is stopped, the metal becomes solidified inside the passageways 61 of the refractory element 60, as can be seen in the right part of the core 3 represented in FIG. 3. When mounting the electrode, the bars 62 are each fixed to the solid part 3a of the core 3 at one of their ends and to the solid part 3c at their other end by means of tapered screwthreaded portions 63. A passage of the current in the axial direction between the supply terminal and metal bath 5 is thus ensured.

Note that the inlet 23 and the outlet 25 of the cooling fluid of the nipple 18 are located below the zone of contact between the nipple 18 and the conductor 8. The whole of the nipple 18 is thus traversed by the cooling fluid so that, in particular, the zone of contact can be cooled.

The passageways 61 are separated from each other and from the jacket 11 by walls of insulating refractory material so that the metal of each bar 62 is isolated from the neighbouring bars and/or from the jacket 11 in an effective manner. Consequently, in operation, the returns of current toward the inner walls of the jacket are considerably reduced and the convection currents of thermal or electromagnetic origin in the liquid part of the electrode are substantially eliminated, also owing to the elongated shape of the bars. There is consequently a reduction in the heat transfers to the cooled walls and the bottom of the electrode.

The convection currents, upon contact of the solidified steel with the inner walls of the cooling jacket 11 and in the bottom of the ingot mould, have a tendency to shift back the solidification front and to produce the direct contact between the liquid and the cooled copper elements. The elimination of these convection currents therefore enables heat exchanges and the risks of deterioration by an excessive temperature elevation of these elements to be limited. The solid part 3c may be partly or completely formed of lead. This solid element 3c is surrounded by the insulating sleeve 38 of "Viton" whose height is limited relative to the embodiment illustrated in FIG. 1.

The use of lead for the construction of the element 3c permits an improvement in the electric contact between the bars 62 and the element 3c on one hand, and the nipple 18 connected to the conductor 8, on the other hand. Lead indeed has the advantage of being a good electric conductor, above all in the liquid state. In the case of an abnormal overload, a temporarily excessive current passing through the electrode results in a melting of the steel part of the core 3 which stops at the interface between the lead and steel. The bottom of the electrode and the supply of current are thus protected from any risk of accidental piercing. In fact, even when the solid element 3c constituting the electrode does not comprise lead, at the moment of placing the electrode in position, lead contained in the scrap-iron constituting the melting bed of the furnace is present in this part of the electrode, after a rather long time of operation. Indeed, the lead whose density is higher than that of molten steel and which is insoluble in steel, is deposited in the lowest part of the liquid, i.e. in the vicinity of the bottom of the electrode, where it accumulates during the operation of the furnace. This presence of lead which is beneficial in respect of the conductivity, may therefore be increased by pouring lead into the bottom of the electrode or by constructing the lower element from solid lead. The beneficial effect of the presence of lead in the liquid part of the electrode in operation is also due to the fact that as carbon is not soluble in molten lead, no effervescent phenomenon occurs in the corresponding part of the electrode. On the other hand, in electrodes of steel, the effervescence produces or amplifies the convection currents and its effect is added to the thermal and electromagnetic effects.

I claim:

1. An electrode structure in combination with a vessel having a wall and an inner refractory lining lining said wall, for a bath of molten metal, the electrode structure being embedded in the refractory lining, flush at one end of the electrode structure with an inner surface of said refractory lining and projecting adjacent an opposite end out of the vessel, said electrode structure comprising a central electrically conductive core extending through said wall of the vessel and a cooling jacket disposed around said central core and in close contact therewith, and an electric supply terminal directly connected to the end of the central core outside the vessel, the improvement comprising said central core having electrical insulating means arranged between said central core and said cooling jacket in a zone adjacent to the outer end of said central core connected to the electric supply terminal.

2. An electrode structure according to claim 1, comprising an electrically insulating sleeve interposed between the central core and the cooling jacket in a part adjacent to the outer end of the core, the core being inserted in the insulating sleeve.

3. An electrode structure according to claim 2, wherein the central core comprises in succession from its end flush with the inner surface of the lining and in contact with the bath of metal to its end connected to the supply terminal, a first solid metal part, a composite part comprising an element of refractory material inserted in the cooling jacket and provided with a plurality of passageways extending axially of the core inside each of which passageways is disposed a metal bar, and a second solid metal part of connection between the core and the supply terminal surrounded by the insulating sleeve, each of said bars being connected to the first solid metal part at one end of the bar and to the second solid metal part at an opposite end of the bar and separated from the other bars by a wall formed in the element of refractory material.

4. An electrode structure according to claim 3, wherein said bars are separated from the cooling jacket by a wall in the element of refractory material.

5. An electrode structure according to claim 3, wherein the second solid metal part of the core comprises at least partly lead.

6. An electrode structure according to claim 1, wherein the cooling jacket projects into the refractory lining and a fixing flange connects the cooling jacket to the wall of the vessel.

7. An electrode structure according to claim 1, comprising a suspension flange connected to the end of the central core outside the vessel and telescopic arms connecting the suspension flange to the fixing flange.

8. An electrode structure according to claim 1, wherein means for electrically connecting the end of the central core outside the vessel to the supply terminal comprise an internally cooled nipple in one piece with the terminal end screwthreadedly engaged in the central core.

9. An electrode structure according to claim 7, wherein means for electrically connecting the end of the central core outside the vessel to the supply terminal comprise an internally cooled nipple in one piece with the terminal and screwthreadedly engaged in the central core and interconnecting the suspension flange and the central core.

10. An electrode structure according to claim 2, wherein the cooling jacket has an outer case and a double wall, namely a first inner wall connected by an upper end to the outer case of the jacket, the first inner wall having an inner surface in contact with the core and the sleeve, and a second median wall disposed inside an annular volume defined by said first wall and said case of the jacket, the first wall being capable of freely expanding by its lower edge.

11. An electrode structure according to claim 10, wherein the lower part of the case of the cooling jacket forms a spigot having an inside diameter slightly larger than an outside diameter of said first wall, a seal being provided for the cooling liquid by an O-ring disposed in a groove formed in an inner surface of the spigot in facing relation to said first wall, a compensating bellows completing said seal and connected at one of its ends to the spigot and at an opposite end to the lower edge of the first wall.

12. An electrode structure according to claim 11, comprising a cap for protecting the bellows and capping the spigot and provided with an orifice having a diameter equal to an outside diameter of the sleeve.

13. An electrode structure according to claim 10, wherein the outer case of the jacket comprises an annular inner ring in one piece therewith and having an inside diameter slightly larger than a diameter of said second wall, said inner ring defining a separation between an inlet and an outlet for the cooling fluid of the doublewalled jacket and a seal being provided by an O-ring disposed in a groove formed in an inner surface of the inner ring in facing relation to said second wall.

14. An electrode structure according to claim 6, wherein the fixing flange is made in three circular sectors and bears between two shoulders formed on an outer surface of a case of the cooling jacket.

15. An electrode structure according to claim 6, wherein an electric insulating element is interposed between the fixing flange and the wall of the vessel.

* * * * *